(12) United States Patent
Willibald-Ettle et al.

(10) Patent No.: US 6,458,400 B1
(45) Date of Patent: *Oct. 1, 2002

(54) HARD CONFECTIONS CONTAINING A SWEETENER

(75) Inventors: Ingrid Willibald-Ettle, Landau; Hanspeter Degelmann, Worms; Jörg Kowalczyk, Bockenheim; Markwart Kunz, Worms; Mohammad Munir, Kindenheim; Knut M. Rapp, Offstein, all of (DE)

(73) Assignee: Sudzucker Aktiengesellschaft (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,702
(22) PCT Filed: Feb. 21, 1997
(86) PCT No.: PCT/EP97/00854
§ 371 (c)(1), (2), (4) Date: Sep. 29, 1998
§ 102(e) Date: Sep. 29, 1998
(87) PCT Pub. No.: WO97/30598
PCT Pub. Date: Aug. 28, 1997

(30) Foreign Application Priority Data

Feb. 24, 1996 (DE) .......................... 196 06 968

(51) Int. Cl.$^7$ ............................... A23L 1/236
(52) U.S. Cl. ................. 426/548; 426/658; 426/660
(58) Field of Search ................ 426/548, 658, 426/660

(56) References Cited

U.S. PATENT DOCUMENTS

| | | | |
|---|---|---|---|
| 4,792,453 A | | 12/1988 | Wrigley |
| 4,961,935 A | | 10/1990 | Warner-Lambert Comp. |
| 5,578,339 A | * | 11/1996 | Kunz et al. ............ 426/658 |

FOREIGN PATENT DOCUMENTS

| | | |
|---|---|---|
| DE | 19523008 | 1/1996 |
| EP | 0109009 | 5/1984 |
| EP | 0625578 | 11/1994 |
| FR | 2179966 | 11/1973 |
| NL | 9001940 | 4/1992 |

* cited by examiner

*Primary Examiner*—Leslie Wong
(74) *Attorney, Agent, or Firm*—Ostrolenk, Faber, Gerb & Soffen, LLP

(57) ABSTRACT

The invention relates to confections, in particular hard and soft confections, which contain a sweetener of 1-O-α-D-glucopyranosyl-D-sorbitol (1,1 GPS), in particular 6-O-α-D-glucopyranosyl-D-sorbitol (1,6 GPS), 1-O-α-D-glucopyranosyl-D-sorbitol (1,1 GPS) and 1-O-α-D-glucopyranosyl-D-mannitol (1,1 GPM); and to the use of this sweetener in confections, in particular pharmaceutically active confections.

12 Claims, 2 Drawing Sheets

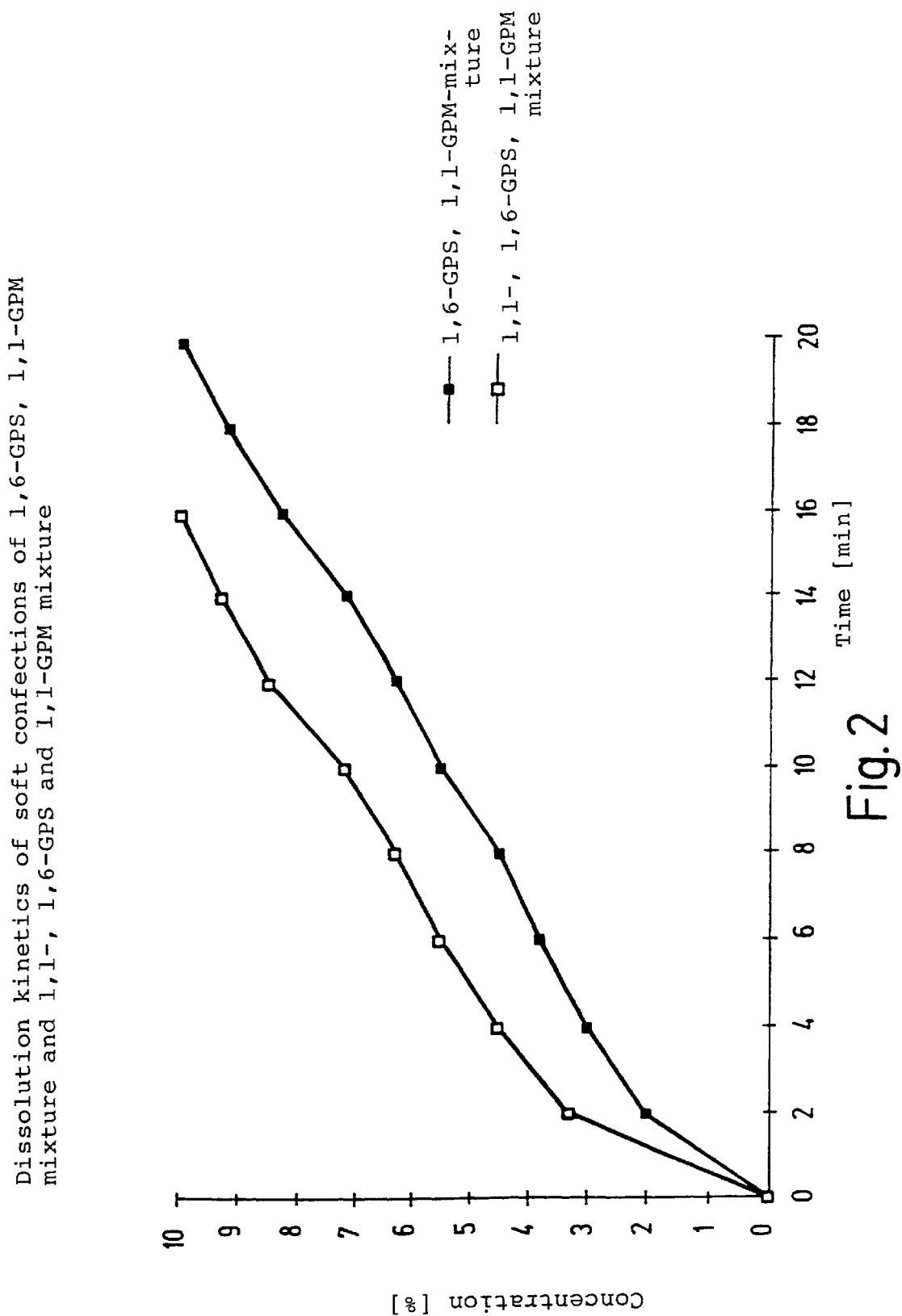

HARD CONFECTIONS CONTAINING A SWEETENER

DESCRIPTION

The present invention relates to sweetener-containing, in particular sugar-free, soft and hard confections, and to the use of the sweetener in these confections.

EP-A2 0 303 295 describes a hard confection which comprises meso-erythritol as main component and other saccharides such as sucrose, glucose, malt syrup, fructose, isomaltulose and isomaltose. U.S. Pat. No. 4,587,119 describes the use of isomaltulose as sucrose substitute in certain foods and pharmaceutical products. U.S. Pat. No. 4,971,798 discloses hard confections which comprise hydrogenated isomaltulose. Hydrogenated isomaltulose is a virtually equimolar mixture of 6-O-α-D-glucopyranosyl-D-sorbitol (=1,6 GPS) and the stereoisomeric 1-O-α-D-glucopyranosyl-D-mannitol (=1,1 GPM). Hydrogenated isomaltulose is prepared by enzymatically isomerizing sucrose, the resulting isomaltulose being separated off from the other constituents, such as trehalulose and isomaltose, and the isomaltulose being hydrogenated to form 1,6-GPS and 1,1-GPM, 1,1 GPM crystallizing out as the dihydrate. The hydrogenated isomaltulose used in said hard confections is therefore distinguished by a highly complex production process as well as by unimprovable solubility, sweetening power and recrystallization tendency.

The technical problem underlying the invention is therefore to prepare confections which overcome the above-mentioned disadvantages, that is to say have in particular an improved solubility behavior, higher sweetening power and reduced recrystallization tendency.

This technical problem is solved by providing the confections providing confections which comprise, as sweetener, 1-O-α-D-glucopyranosyl-D-sorbitol (=1,1 GPS). Confections of this type are distinguished by an improved solubility behavior and improved sweetening power. In particular, the invention relates to confections which comprise, as sweetener, a sweetener mixture of 6-O-α-D-glucopyranosyl-D-sorbitol (=1,6 GPS), 1-O-α-D-glucopyranosyl-D-sorbitol (=1,1 GPS) and 1-O-α-D-glucopyranosyl-D-mannitol (=1,1 GPM). 1,1 GPM can be present in this case anhydrous or in the form of its dihydrate.

Confections of this type therefore have as sweetener 1,1 GPS or a mixture of 1,6 GPS, 1,1 GPS and 1,1 GPM, and thus preferably comprise only non-cariogenic, low-calorie sweeteners which are suitable for diabetics. In addition, 1,1 GPS decreases the recrystallization tendency of 1,1-GPM. The confections according to the invention also have, in particular, due to their 1,1 GPS content, increased solubility and sweetening power in comparison with hydrogenated isomaltulose (also called Isomalt). Surprisingly, it has been found that the confections according to the invention have a dissolution rate between that of confections comprising conventional sugar and that of those comprising hydrogenated isomaltulose. The confections according to the invention therefore advantageously extend the spectrum of the confections available for the widest purposes and requirements. The confections according to the invention are, just like confections comprising hydrogenated isomaltulose, non-hygroscopic and, owing to their 1,1 GPS content, have improved shelf life. Finally, a further advantage is due to the variability of the sweetener mixture used, since, by varying the proportions of 1,6 GPS, 1,1 GPS and 1,1 GPM, confections having different texture, surface structure and solubility behavior can be produced. These particular properties make confections according to the invention unexpectedly particularly suitable for the application of pharmaceutical active ingredients whose release in the mouth and throat area is intended to take place continuously and begin rapidly. The confections according to the invention, on account of the described solubility behavior enable a, in comparison with sugar-containing confections, long-duration continuous release of active ingredient which, in contrast to confections comprising hydrogenated isomaltulose, begins very rapidly. In the context of the present invention, pharmaceutical active ingredients are taken to mean active ingredients which exert a desired physiological effect on the human or animal body and serve the prophylaxis or therapy of disorders or deficiency symptoms.

Finally, the confections according to the invention comprising the above-mentioned mixture may be produced more simply and cost-effectively, since the sweetener mixture present therein is comparatively simple to obtain. This is because, in the production of confections which comprise hydrogenated isomaltulose, after isomerization of the starting material, that is the sucrose, the resulting isomaltulose must first be separated from the trehalulose and isomaltose. This is not necessary according to the invention, since the sweetener mixture used is produced directly from the isomerization product, that is trehalulose, isomaltulose and isomaltose. The confections according to the invention may also be produced under gentler conditions, since the melt comprising the sweetener mixture is smoother and therefore a gentler and lighter processing of the sensitive active ingredients and/or flavorings is possible at low temperatures. The stamping temperatures can also be decreased.

In a particularly preferred embodiment, the invention provides that the confections comprise at least 1% by weight of 1,1 GPS or a sweetener mixture which comprises at least 1% by weight of 1,1 GPS, based on the total weight of the sweetener mixture.

The confections according to the invention can additionally comprise sugar, such as sucrose, or, particularly preferably, can be sugar-free and thus non-cariogenic.

In a further preferred embodiment of the invention, a confection is prepared which comprises a sweetener mixture which comprises 10 to 50% by weight of 1,6 GPS, 2 to 20% by weight of 1,1 GPS and 30 to 70% by weight of 1,1 GPM (based on the total dry matter content of the sweetener mixture). A particularly effective reduction of the recrystallization tendency of 1,1 GPM is obtained by using a sweetener mixture in the confections according to the invention which comprises 5 to 10% by weight of 1,6 GPS, 30 to 40% by weight of 1,1 GPS and 45 to 60% by weight of 1,1 GPM (based on the total dry matter content of the sweetener mixture).

According to the invention, it is also provided that the sweetener present in the confections additionally comprises sugar alcohols, in particular maltitol, hydrogenated starch hydrolysates (HSH), erythritol, sorbitol, xylitol, lactitol and/ or mannitol. Mannitol can preferably be used in an amount of 0.4 to 4% by weight and sorbitol in an amount of 1 to 9% by weight, based on the total dry matter content of the sweetener.

Finally, it can particularly preferably be envisaged to add one or more pharmaceutically active ingredients, colorants, intensive sweeteners, fillers, flavors, fat substitutes and/or an organic acid to the 1,1 GPS or the sweetener mixture.

In particular, it can therefore be provided to add clinically active substances, such as antihistamines, antibiotics, fungicides, microbicides, hexylresorcinol, dextromethorphan hydrobromide, menthol, nicotine, caffeine, vitamins, mentholeucalyptus, benzocaine, cetylpyridinium, fluorides, phenylpropanolamine or other pharmaceutically active substances to the confections according to the invention.

The flavorings to be used according to the invention can be synthetic substances or, for example, oils produced from plants or fruits such as citrus oil or fruit essences. Therefore, oils from menthol, eucalyptus, peppermint and other aroma substances can be used. The flavorings are added in an amount of 0.05 to 3% by weight, based on the total weight of the confections.

According to the invention, it can also be provided to add intensive sweeteners, such as aspartame, cyclamate, acesulfame-K, saccharin, sucralose, alitame, neohesperidin DC, stevioside, thaumatin or the like, to the confections according to the invention to increase the sweetening power.

Finally, binders, for example from the group consisting of alginates, gelatin, cellulose or vegetable gums, can also be used.

Colorants which are suitable are synthetic or natural colorants. As synthetic colorants, use can be made of, for example, erythrosine, indigo carmine, tartrazine or titanium dioxide, while natural colorants can be, for example, karotenoids (for example β-karotene), riboflavin, chlorophyll, anthocyanins (beetroot), betanine or the like. If synthetic colorants are used, typically, 0.01 to 0.03% by weight of colorant is used, whereas if natural colorants are used, 0.1 to 1% by weight (in each case based on the total weight of the confection) is used.

As fillers, for example polydextrose or inulin can serve.

Fat substitutes which can be used are, for example, capranin, salatrim or olestra.

As organic acids, use can be made of, for example, citric acid, maleic acid, tartaric acid, ascorbic acid or similarly acting food-compatible acids.

According to the invention, the confection can be made as a hard or soft confection. A hard confection is an amorphous product produced by the evaporation of water from a sugar mixture or sugar substitute mixture, so concentrating this to a dry matter content of no less than 95% by weight. Hard confections of this type can be made batchwise, continuously or by melt extrusion. The hard confections can be in stamped or cast form and can, if appropriate, comprise fillings, for example maltitol syrup. The invention therefore relates, for example, to hard confections which comprise the above-mentioned sweetener mixture in an amount of 10 to 99% by weight, preferably 90 to 99% by weight, a flavoring in an amount of 0.01 to 2.5% by weight, an intensive sweetener in an amount of 0.05 to 0.25% by weight, an organic acid in an amount of 0.1 to 5.0% by weight (in each case based on the total weight of the confection), water and, if appropriate when used as a clinically active hard confection, a clinical active ingredient in an amount of 1.0 to 15 mg per unit. The invention also relates to hard confections which comprise 50 to 98% by weight of sweetener mixture, 0.05 to 0.3% by weight of flavoring, 0.05 to 0.25% by weight of intensive sweetener, 0.2 to 2.5% by weight of organic acid (in each case based on the total weight of the confection), water, and if appropriate in the case of a clinically active hard confection, 0.05 to 25 mg per unit of clinically active ingredient.

Finally, the invention relates to the use of 1,1 GPS or of a sweetener mixture of 1,6 GPS, 1,1 GPS and 1,1 GPM in a confection to improve the release of active ingredient and/or aroma substances, to increase the sweetening power and to achieve an improved texture and decrease the recrystallization tendency. The increased solubility of the sweetener mixture, and thus of the hard confection, due to the presence of 1,1 GPS, inter alia, leads to a subjectively higher sweetening power and to an accelerated release of active ingredient and aroma substance. 1,1 GPS, in addition, reduces the recrystallization tendency of the 1,1 GPM likewise present in the sweetener mixture and thus improves the shelf life and texture of the confections according to the invention.

The examples below illustrate the invention.

FIG. 2 shows dissolution kinetics of soft confections which comprise the sweetener mixture used according to the invention of 1,6 GPS, 1,1 GPS and 1,1 GPM, in comparison with soft confections which comprise Isomalt (hydrogenated isomaltulose).

EXAMPLE 1

Figure 1:
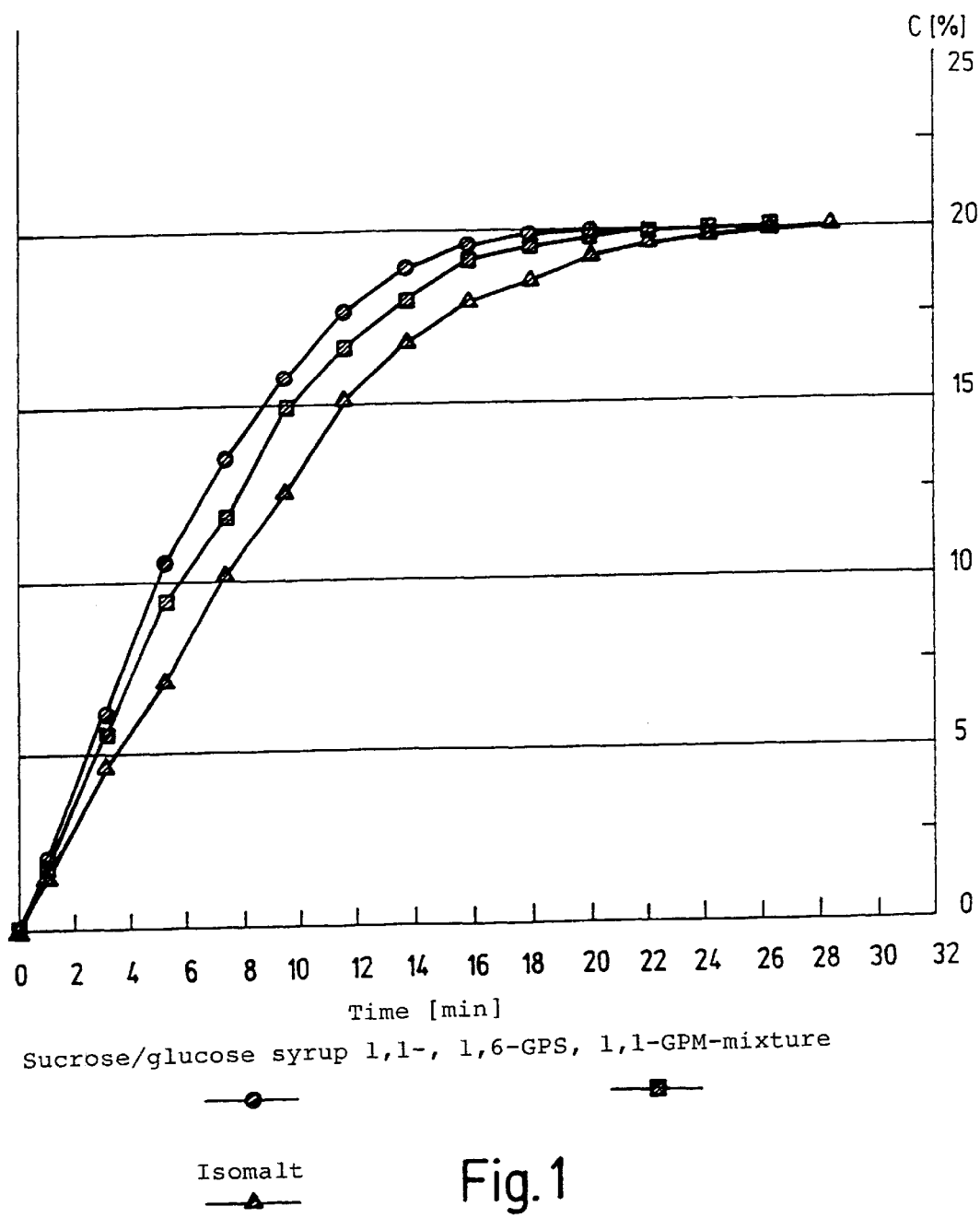
FIG. 1 shows dissolution kinetics of hard confections which comprise the sweetener mixture used according to the invention of 1,6 GPS, 1,1 GPS and 1,1 GPM, in comparison with hard confections which comprise Isomalt (hydrogenated isomaltulose) or sucrose and glucose syrup.

Production of soft confections (fruit flavor), comprising a sweetener mixture of 1,6 GPS, 1,1 GPS and 1,1 GPM.

| Formula | |
| --- | --- |
| Sweetener mixture (45.3% by weight of 1,6 GPS, 4.1% by weight of 1,1 GPS and 50.6% by weight of 1,1 GPM, based on dry matter) | 32 kg |
| Raftilose L 95 (80% DM, fructooligosaccharides) | 51 kg |
| Water | 5 kg |
| Gelatin 120 Bloom (40%) | 3.6 kg |
| Vegetable fat (34 to 36° C. mp.) | 6 kg |
| Emulsifier | 0.8 kg |
| Citric acid (monohydrate) | 0.7 kg |
| Aroma substance (lemon) | 0.1 kg |

Production 24 kg of sweetener mixture, Raftilose L 95 and water are cooked in a batch cooker to 132° C. to 136° C. (depending on desired consistency), the gelatin solution, vegetable fat, emulsifier and citric acid and the remaining sweetener mixture (8 kg) are added in the sequence specified and are mixed at high speed for 2 to 3 min, until a homogeneous mass is present. Finally, aroma substance is added and the vessel is drained. Homogenization with the use of a suitable homogenizer (Homozenter) is advantageous. The soft confection mass cooled to 44° C. to 46° C. is then drawn for 5 to 10 min (temperature then 47° C. to 49° C.).

In contrast to conventional sugar-free soft confections, the product produced above only comprises ingredients suitable for diabetics.

The soft confections according to the invention are distinguished by a smoother texture.

EXAMPLE 2

Production of clinically active hard confections (menthol) comprising a sweetener mixture of 1,6 GPS, 1,1 GPS and 1,1 GPM.

| Formula | |
| --- | --- |
| Sweetener mixture of 1,6 GPS, 1,1 GPS and 1,1 GPM (46.2% by weight of 1,6 GPS, 4.2% by weight of 1,1 GPS and 49.6% by weight of 1,1 GPM, based on dry matter) | 25 kg |
| Water | 8 kg |
| Menthol | 0.1 kg |
| Citric acid | 0.3 kg |
| Acesulfam K | 25 g |

Production

The sweetener mixture is heated with water in the bonbon cooker to 155° C. to 160° C., exposed to a complete vacuum for 5 min and after the mass is cooled to 110 to 115° C., menthol, acid and, if appropriate, sweeteners are also added.

The mass is then stamped to form bonbons and cooled.

The above-mentioned formula can also be processed on a continuous cooking plant (Bosch, Klöckner) or processed without addition of water in a melt extrusion process to form bonbons. According to the invention, both stamped and cast hard confections can be produced.

The confections produced release methol rapidly, continuously and for a long period.

EXAMPLE 3

Production of filled hard confections comprising a mixture of 1,6 GPS, 1,1 GPS and 1,1 GPM.

1. Hard Confection Mass

| Formula | |
| --- | --- |
| Sweetener mixture of 1,6 GPS, 1,1 GPS and 1,1 GPM (9.8% by weight of 1,6 GPS, 39.5% by weight of 1,1 GPS and 50.7% by weight of 1,1 GPM, based on the dry matter content of the sweetener mixture) | 25 kg |
| Water | 8 kg |
| Citric acid | 0.3 kg |
| Lemon aroma | 0.03 kg |

Production

The sweetener mixture and water are cooked in the bonbon cooker at 155° C. to 160° C., exposed to complete vacuum for 5 min and then acid and aroma are added. The melt is cooled to 65° C. to 70° C. in the conical roller.

2. Filling

| Formula | |
| --- | --- |
| Raftilose L 95 (fructooligosaccharides) | 2.5 kg |
| Sweetener mixture (9.8% by weight of 1,6 GPS, 39.5% by weight of 1,1 GPS 50.7% by weight of 1,1 GPM, based on the dry matter content of the sweetener mixture) | 5.9 kg |
| Water | 1.5 kg |
| Citric acid | 0.09 kg |
| Lemon aroma | 0.01 kg |

Production

Raftilose L 95 is heated to 80° C. with water, finely pulverulent sweetener mixture is dissolved therein, after cooling to 70° C., acid and aroma are added and, as filling in the conical roller, processed into the plastic melt of sweetener mixture. The filling is approximately 10 to 15% of the total bonbon mass.

The shell of the filled hard confections is stable to uptake of atmospheric water (good storage behavior), the filling is liquid and suitable for diabetics because of the absence of maltitol syrup.

In the above-mentioned formula, the sweetener mixture can be replaced to 90% by weight, preferably up to 20% by weight, by another sugar substitute, for example lactitol, maltitol, xylitol, sorbitol, maltitol syrup, erythritol and/or hydrogenated starch hydrolysates (HSH). The liquid filling Raftilose L 95 can be replaced by another sugar substitute, for example maltitol syrup.

EXAMPLE 4

Dissolution kinetics of hard confections (saccharide glasses) of hydrogenated isomaltulose (Isomalt), sucrose/glucose syrup and a sweetener mixture of 1,1 GPS, 1,6 GPS and 1,1 GPM.

To compare the dissolution behavior of confections which comprise Isomalt, sucrose/glucose syrup or a sweetener mixture of 1,1 GPS, 1,6 GPS and 1,1 GPM, dissolution kinetics of the confections were recorded.

The hard confections comprising Isomalt contained no 1,1 GPS (46.3% by weight of 1,1 GPM, 48.5% by weight of 1,6 GPS, based on the dry matter content of the raw material used). The hard confections comprising sucrose/glucose syrup comprised a raw material from 100 of parts crystalline sucrose and 80 parts of glucose syrup having a dry matter content of 80% by weight. 1,1 GPS was likewise not present in these confections. The hard confections comprising 1,1 GPS comprised 53% by weight of 1,1 GPM, 2% by weight of 1,1 GPS and 37% by weight of 1,6 GPS (based on the dry matter content of the raw material used).

The dissolution behavior was determined at 37° C. in a solution as specified in Article 35 of the German Food and Essential Commodities Act. The amount of solvent and hard confections used was selected so that a 20% strength solution is formed on complete dissolution of the confections. The increase in density of the solution was determined as a function of time and the concentration in g of DM per 100 g of solution was determined therefrom.

FIG. 1 shows that the 1,1 GPS-containing hard confections had an increased solubility in comparison with confections which comprise Isomalt. The dissolution time for Isomalt-containing confections was 28.5 min, whereas the dissolution time for 1,1 GPS-containing confections was 24 min. The 1,1 GPS-containing confections had a reduced solubility in comparison with confections comprising sucrose/glucose syrup (dissolution time of the confections comprising sucrose/glucose syrup: 22 min). The confections according to the invention therefore advantageously extend the spectrum of carriers available, for example, for the administration of medicaments. The confections according to the invention, just like Isomalt-containing confections, are non-cariogenic and suitable for diabetics, but have an improved solubility.

EXAMPLE 5

Threshold Testing

To determine the intensity of the sweetening power of the confections according to the invention, a sensory analysis was carried out in the form of a threshold test. In this process, a concentration series was given a sensory test in ascending concentration (0 to 2.5% strength solution), without retasting, and rated using a numerical scale. The threshold value determined by this test gives the concentration of the respective solution at which the basic taste "sweet" was clearly identified by the testers. In this test, an aqueous solution of a sweetener mixture of 2% by weight of 1,1 GPS, 53% by weight of 1,1 GPM and 37% by weight of 1,6 GPS (based on the dry matter of the mixture used) was used.

TABLE 1

| Sample identification | Concentration [g/100 g] | Identification of the threshold value [%] |
| --- | --- | --- |
| 230196/1 | 0 | 0 |
| 230196/2 | 0.5 | 15 |
| 230196/3 | 1.0 | 50 |
| 230196/4 | 1.5 | 35 |
| 230196/5 | 2.0 | 0 |
| 230196/6 | 2.5 | 0 |

A similar study was performed with hard confections which comprised a sweetener mixture of the above-mentioned composition in ascending concentration. The results correspond exactly to those of Table 1 above.

In comparison, a concentration series of solutions or hard confections was tasted which comprised hydrogenated isomaltulose (Isomalt) (46.3% by weight of 1,1 GPM, 48.5% by weight of 1,6 GPS, based on the dry matter of the mixture used):

TABLE 2

| Sample identification | Concentration [g/100 g] | Identification of the threshold value [%] |
| --- | --- | --- |
| 230196/7 | 0 | 0 |
| 230196/8 | 0.5 | 10 |
| 230196/9 | 1.0 | 20 |
| 230196/10 | 1.5 | 45 |
| 230196/11 | 2.0 | 25 |
| 230196/12 | 2.5 | 0 |

The evaluation of the threshold test shows that the mean threshold of the Isomalt sample is at a 1.67% strength concentration, while the mean threshold with the confections according to the invention is at a 1.11% strength concentration. It can be concluded therefrom that the fundamental taste "sweet" of the sweetener mixture concentration series according to the invention was detected approximately 33% earlier by the testers than in the comparison series. The sweetness of the confections according to the invention is therefore more intense than that of the comparison confections.

EXAMPLE 6

Pairwise Difference Testing

In order to determine the intensity of sweetness of the confections according to the invention and of the sweetener mixture used therein, a sensory analysis was carried out in the form of a pairwise difference test (duo test). In this method, the products according to the invention (production from a raw material of the composition as in Example 5) were tasted in comparison with products comprising Isomalt (hydrogenated isomaltulose) (composition as in Example 5) in a direct comparison as 10% strength solutions and as hard confections. In this test, the testers had to determine the sample having the higher sweetness intensity. In order to obtain significant results, the duo-test was performed twice using the same concentrations. Therefore, each tester received two sample pairs for determining which of the samples had a more intense sweetening power in taste. Retasting was allowed in this method.

In the pairwise difference test, it was established that in a first sample pair, 80% (8 of 10 testers) of the participating testers regarded the solution comprising the 1,1 GPS-containing sweetener mixture, or the hard confections comprising this sweetener mixture as sweeter than Isomalt products. With a second sample pair, it was found that 90% (9 of 10 testers) perceived the 1,1 GPS-containing solution or the 1,1 GPS-containing hard confections as sweeter than the hydrogenated isomaltulose (Isomalt), as solutions or hard confections comprising comparison substance.

On account of the taste testing results, it can be assumed that the samples (solutions, hard confections) which comprise the sweetener mixture used according to the invention have a higher sweetness intensity than the samples which comprise the comparison substance Isomalt (hydrogenated isomaltulose).

EXAMPLE 7

Dissolution kinetics of soft confections of hydrogenated isomaltulose (Isomalt) and a sweetener mixture of 1,1 GPS, 1,6 GPS and 1,1 GPM.

To compare the dissolution behavior of soft confections which comprise the hydrogenated isomaltulose (46.3% by weight of 1,1 GPM, 48.5% by weight of 1,6 GPS, based on DM) or a sweetener mixture of 1,1 GPS, 1,6 GPS and 1,1 GPM (53% by weight of 1,1 GPM, 2% by weight of 1,1 GPS, 37% by weight of 1,6 GPS, based on DM) dissolution kinetics of confections having the compositions shown in Tables 3 and 4 were recorded.

The formula listed in Table 3 represents the composition of the soft confections comprising hydrogenated isomaltulose.

TABLE 3

| Components | % | g-Component |
|---|---|---|
| 1,6-GPS, 1,1-GPM mixture (Type M) | 24.20 | 96.8 |
| Maltitol syrup (75% DM) | 51.30 | 205.2 |
| Water | 5.00 | 20.0 |
| Gelatin 120 Bloom (40%) | 3.55 | 14.2 |
| Vegetable fat (ACOPECT 35, Karlshamns) | 5.80 | 23.2 |
| Emulsifier | 0.75 | 3.0 |
| Citric acid | 0.70 | 2.8 |
| 1,6-GPS, 1,1-GPM mixture (Type PF) | 8.40 | 33.6 |
| Color (10% strength solution) | 0.05 | 0.2 |
| Aroma substance | 0.25 | 1.0 |
| Sum | 100 | 400 |

Table 4 below gives the composition of the soft confections according to the invention having 1,1 GPS.

TABLE 4

| Components | % | g-Component |
|---|---|---|
| 1,1-, 1,6-GPS, 1,1-GPM mixture (Type M) | 24.20 | 96.8 |
| Maltitol syrup (75% DM) | 51.30 | 205.2 |
| Water | 5.00 | 20.0 |
| Gelatin 120 Bloom (40%) | 3.55 | 14.2 |
| Vegetable fat (ACOPECT 35, Karlshamns) | 5.80 | 23.2 |
| Emulsifier | 0.75 | 3.0 |
| Citric acid | 0.70 | 2.8 |
| 1,1-, 1,6-GPS, 1,1-GPM-mixture (type PF) | 8.40 | 33.6 |
| Color 10% strength solution) | 0.05 | 0.2 |
| Aroma substance | 0.25 | 1.0 |
| Sum | 100 | 400 |

In this example, the sweeteners used were dissolved out of the soft confection masses by means of a laboratory kneader. Each experimental batch comprised 40 grams of soft confections and 150 grams of deionized water.

The temperature during the dissolution was 37° C., the speed of the laboratory kneader was 10 rpm. The maximum experimental time was 20 minutes, samples having been removed after 2, 4, 6, 8, 10, 12, 14, 16, 18 and 20 minutes.

It was found that the total dissolution time for the confections containing hydrogenated isomaltulose was 20 minutes, while the total dissolution time for the soft confections comprising the 1,1-GPS-containing mixture was 16.5 minutes.

Table 5 shows the results of the dissolution experiments in their time course.

TABLE 5

| Sweetener | 0 min c [%] | 2 min c [%] | 4 min c [%] | 6 min c [%] | 8 min c [%] | 10 min c [%] | 12 min c [%] | 14 min c [%] | 16 min c [%] | 18 min c [%] | 20 min c [%] |
|---|---|---|---|---|---|---|---|---|---|---|---|
| 1,6-GPS, 1.1-GPM-mixture | 0 | 2.0 | 3.0 | 3.8 | 4.5 | 5.6 | 6.3 | 7.2 | 8.3 | 9.4 | 10.0 |
| 1,1-, 1,6-GPS, 1,1-GPM-mixture | 0 | 3.3 | 4.5 | 5.5 | 6.3 | 7.2 | 8.3 | 9.4 | 10.0 | 10.0 | 10.0 |

FIG. 2 shows that the 1,1-GPS-containing soft confections have an increased solubility in comparison with confections which comprise hydrogenated isomaltulose. The soft confections according to the invention therefore have an improved solubility, which leads to improved initial sweetness and improved aroma release.

We claim:

1. A method of improving a hard confection by improving the release of an active ingredient therein or improving the release of aroma or increasing the sweetening power, or improving the texture, or achieving a combination thereof which comprises employing in the hard confection at least 1% by weight of a sweetener comprising 1-O-α-D-glucopyranosyl- D-sorbitol (1,1-GPS), wherein the 1,1-GPS is 4.1 to 39% by weight of the hard confection, and wherein the hard confection is produced by heating the sweetener mixture with water to 155° C. to 160° C., exposing the mass to a complete vacuum for 5 minutes and then cooling to 110° C. to 115° C.

2. The method of claim 1, wherein the sweetener comprises a mixture of 1,1 GPS, 6-O-α-D-glucopyranosyl-D-sorbitol (1,6 GPS) and 1-O-α-D-glucopyranosyl-D-mannitol (1,1 GPM).

3. The method of claim 2 in which the sweetener mixture comprises 10 to 50% by weight of 1,6 GPS, 2 to 20% by weight of 1,1 GPS and 30 to 70% by weight of 1,1 GPM.

4. The method of claim 2 in which the sweetener mixture comprises 5 to 10% by weight of 1,6 GPS, 30 to 40% by weight of 1,1 GPS and 45 to 60% by weight of 1,1 GPM.

5. The method of claim 4 in which the sweetener mixture comprises 10 to 99% by weight of the hard confection.

6. The method of claim 5 in which the sweetener mixture comprises 50 to 98% by weight of the hard confection.

7. The method of claim 3 in which the sweetener mixture comprises 10 to 99% by weight of the hard confection.

8. The method of claim 7 in which the sweetener mixture comprises 50 to 98% by weight of the hard confection.

9. The method of claim 2 in which the sweetener mixture comprises 10 to 99% by weight of the hard confection.

10. The method of claim 9 in which the sweetener mixture comprises 50 to 98% by weight of the hard confection.

11. The method of claim 1 in which the sweetener mixture comprises 10 to 99% by weight of the hard confection.

12. The method of claim 11 in which the sweetener mixture comprises 50 to 98% by weight of the hard confection.

* * * * *